United States Patent [19]
Sansone

[11] Patent Number: 5,930,203
[45] Date of Patent: Jul. 27, 1999

[54] FIBER OPTIC HYDROPHONE ARRAY

[75] Inventor: Louis E. Sansone, Moosup, Conn.

[73] Assignee: The United States of America as represented by the Secretary of the Navy, Washington, D.C.

[21] Appl. No.: 09/137,867

[22] Filed: Aug. 10, 1998

Related U.S. Application Data

[62] Division of application No. 08/695,911, Aug. 12, 1996, abandoned.

[51] Int. Cl.$^6$ .................................................... H04R 23/00
[52] U.S. Cl. ............................................................ 367/149
[58] Field of Search ................................... 367/149, 140; 250/227.19

[56]     References Cited

U.S. PATENT DOCUMENTS

| | | | |
|---|---|---|---|
| 5,317,544 | 5/1994 | Maas et al. ............................... | 367/149 |
| 5,363,342 | 11/1994 | Layton et al. ............................ | 367/149 |
| 5,737,278 | 4/1998 | Frederick et al. ....................... | 367/149 |

*Primary Examiner*—Ian J. Lobo
*Attorney, Agent, or Firm*—Michael J. McGowan; Prithvi C. Lall; Michael F. Oglo

[57]     ABSTRACT

A fiber optic hydrophone array is provided in which a plurality of tubes, e.g., fiber optic hydrophones, are to be secured about an elongate elastomeric member having a diameter that hinders each tube from being slid thereover. Each time a tube is to be positioned and secured, longitudinal tension is applied to the elongate elastomeric member to form a reduced cross section along its length in order to facilitate the sliding of each tube therealong. Adhesive is applied about the elongate elastomeric member at a desired position along its length while longitudinal tension is being applied. Then, one tube is slid along the length of reduced cross section to the desired position. The longitudinal tension in the elongate elastomeric member is then relaxed. The reduced cross section expands radially outward thereby forming a void free layer of adhesive between the tube and the elongate elastomeric member.

7 Claims, 4 Drawing Sheets

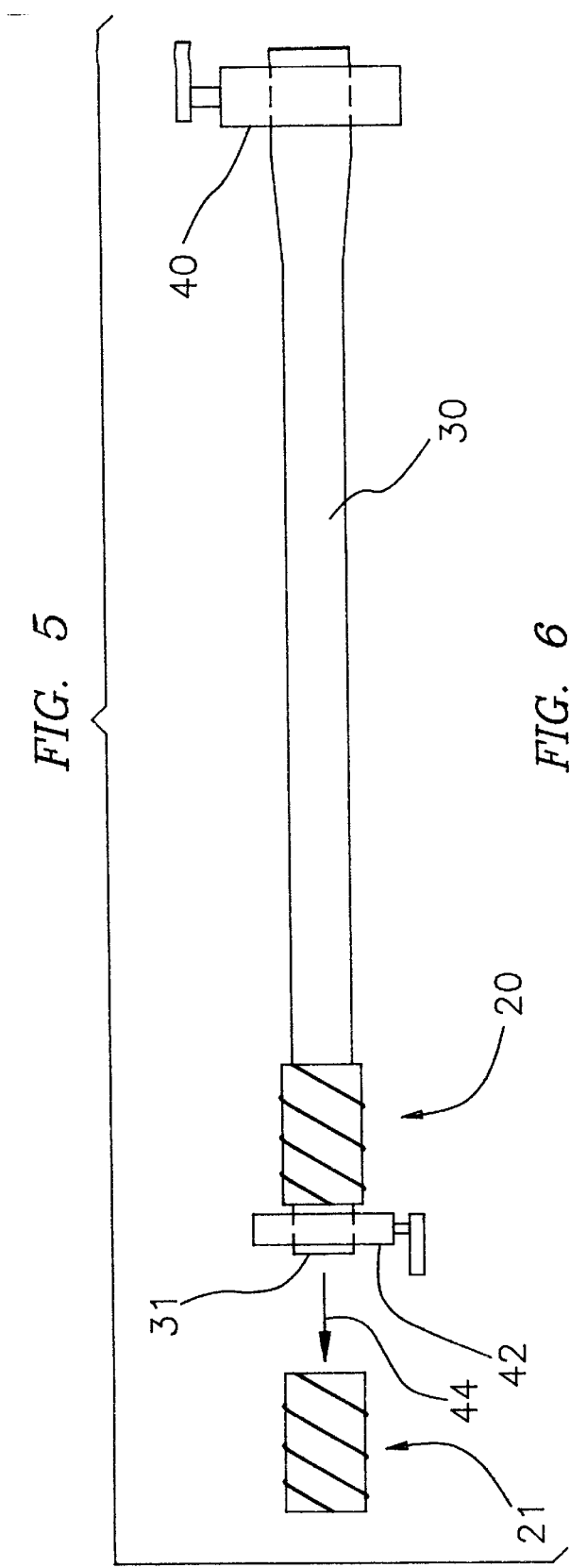
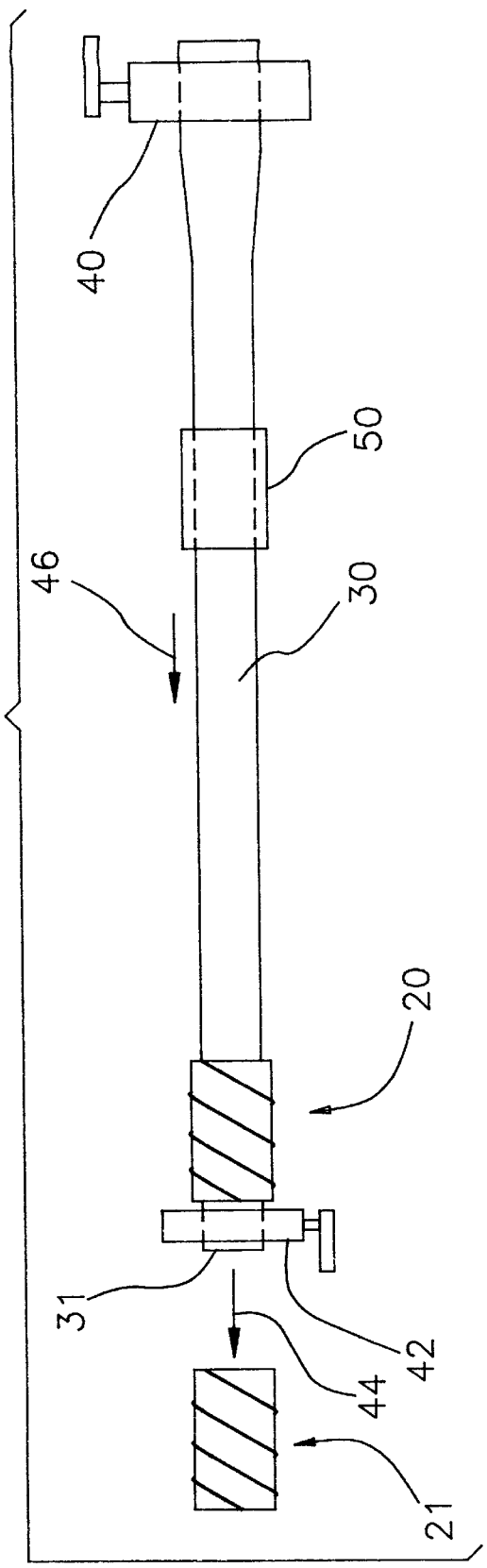

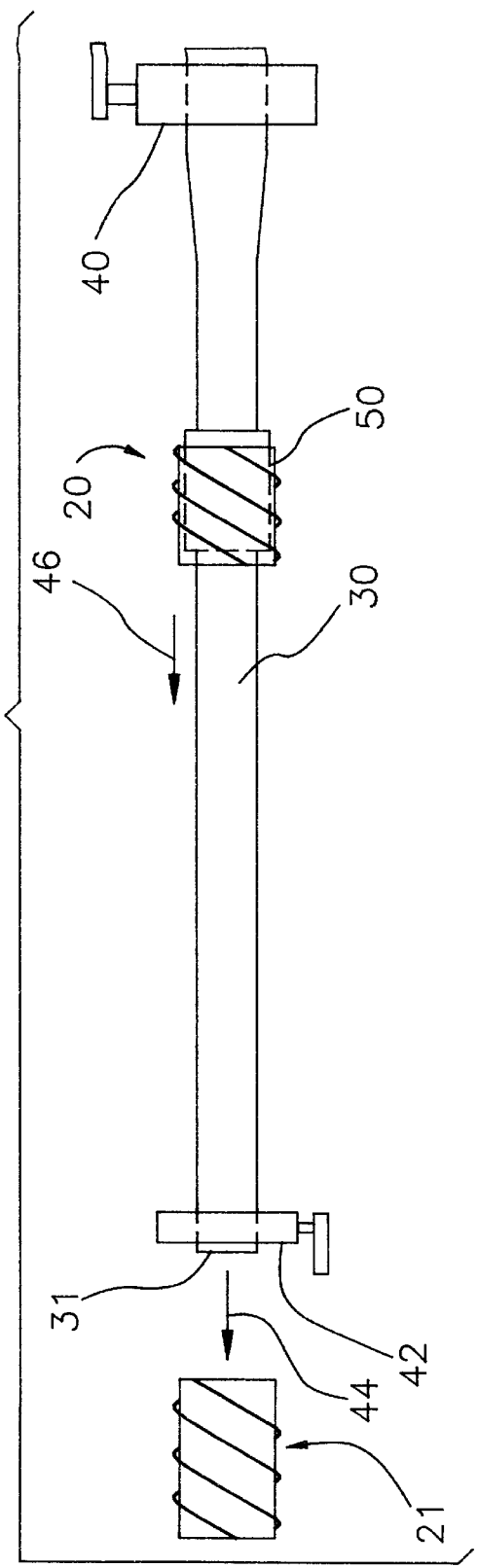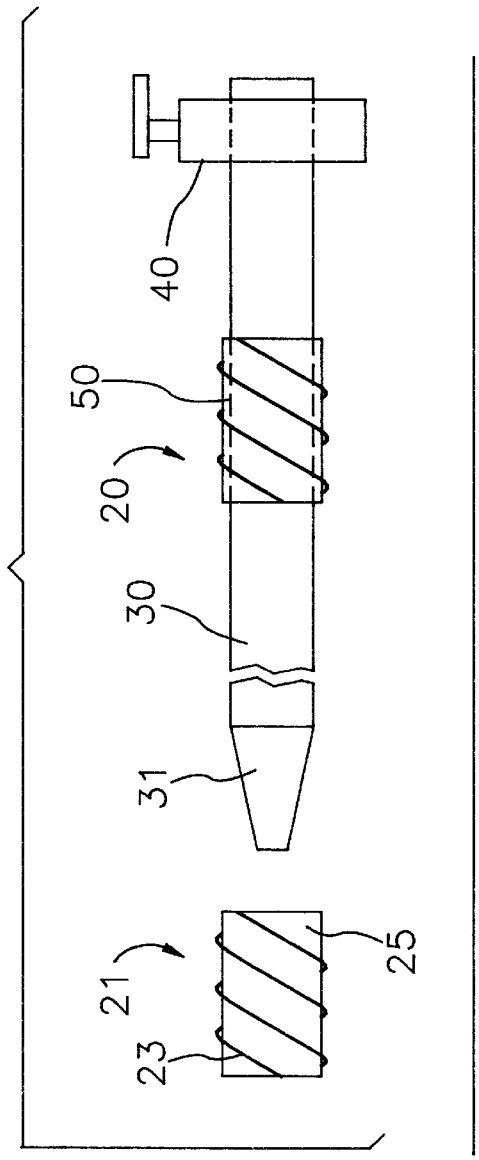

FIBER OPTIC HYDROPHONE ARRAY

This application is a division of application Ser. No. 08/695,911, filed Aug. 12, 1996, now abandoned.

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to a fiber optic hydrophone array, and more particularly to a fiber optic hydrophone array which uses a novel method of positioning and securing a hydrophone on an elongate support member.

(2) Description of the Prior Art

Fiber optic hydrophone arrays consist of a plurality of fiber optic hydrophones attached and supported by a central support member. A fiber optic hydrophone is typically constructed by winding one or more optical fibers on a rigid mandrel. Currently, such hydrophones are fabricated using tubular shaped mandrels. Thus, there is a need to fasten these tubular mandrels to a central support member in the construction of fiber optic hydrophone arrays.

For proper operation of the array, no air voids must be present between the interface of the (outer) tubular mandrel and the (inner) support member. Excessive noise and lost sensitivity result when the air voids are present. The length of the array is such that conventional injection molding methods would be impractical and very expensive. Furthermore, based on the research and development effort in fiber optic hydrophone arrays, design of the array requires that the spacing between each hydrophone be adjustable during the construction phase. Machined molds, even if length considerations were neglected, would require many different variations in this spacing. Using an undersized central member and filling the void between each hydrophone's mandrel and central support member would require a centering fixture and some method of sealing the area until the adhesive was cured in order to prevent the adhesive from dripping out.

SUMMARY OF THE INVENTION

Accordingly, it is an object of the present invention to provide a simple method of positioning and securing a tube on an elongate support.

Another object of the present invention is to provide a method of constructing fiber optic hydrophone arrays to fabricate a fiber optic hydrophone array according to the teachings of subject invention.

Still another object of the present invention is to provide a fiber optic hydrophone array construction that achieves a void-free adhesive interface between each fiber optic hydrophone and the array's central support member.

Other objects and advantages of the present invention will become more obvious hereinafter in the specification and drawings.

In accordance with the present invention, a method of manufacture and resulting construction i.e., a fiber optic hydrophone array is provided in which a plurality of tubes, e.g., fiber optic hydrophones, are to be secured about an elongate elastomeric member at a plurality of positions therealong. The elongate elastomeric member has a free end and a cross section that hinders each tube from being slid thereover. The elongate elastomeric member is clamped a distance from the free end to define a length of the elongate elastomeric member over which no tube is currently secured. A longitudinal tension is applied to the elongate elastomeric member to form a reduced cross section along its length in order to facilitate the sliding of each tube therealong. Adhesive is applied about the elongate elastomeric member at one of the positions along its length while longitudinal tension is being applied. A next successive one of the tubes is slid along the length of the elongate elastomeric member having the reduced cross section to its position. The longitudinal tension in the elongate elastomeric member is then relaxed. This causes the length of reduced cross section to expand radially outward thereby forming a void free layer of adhesive between the tube and the elongate elastomeric member. The steps of clamping, applying longitudinal tension, applying adhesive, sliding and relaxing are repeated for each successive one of the tubes.

BRIEF DESCRIPTION OF THE DRAWING(S)

Other objects, features and advantages of the present invention will become apparent upon reference to the following description of the preferred embodiments and to the drawings, wherein:

FIGS. 4–8 depict a construction sequence of a fiber optic hydrophone array in accordance with the teachings of the present invention wherein:

FIG. 4 is a side view of the fiber optic hydrophones and support member prior to commencement of construction;

FIG. 5 is a side view of the commencement of the construction process;

FIG. 6 is a side view of the support member in tension as the adhesive is applied thereto;

FIG. 7 is a side view of the hydrophone positioned over the adhesive on the support member while the support member is still in tension;

FIG. 8 is a side view of the support member with the hydrophone in place after the tension in the support member is relaxed;

DESCRIPTION OF THE PREFERRED EMBODIMENT(S)

Figure 1:
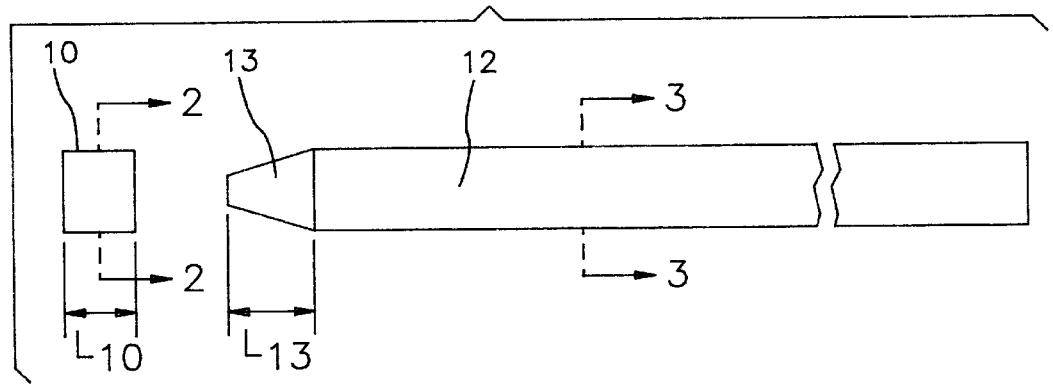
FIG. 1 is a side view of a tube and an elongate elastomeric member used in the construction process according to the teachings of the present invention.
Figure 2:
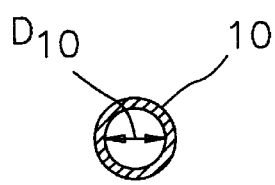
FIG. 2 is a cross-sectional view of the tube taken along line 2—2 of FIG. 1.
Figure 3:
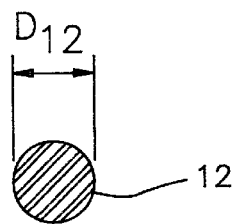
FIG. 3 is a cross-sectional view of the elongate elastomeric member taken along line 3—3 of FIG. 1.

Referring now to the drawings, and more particular to FIGS. 1–3, the elements used in accordance with the present invention are shown in both side and cross-sectional views. FIG. 1 depicts side views of a tube 10 and an elongate member 12 on which tube 10 is to be positioned and secured. FIGS. 2 and 3 respectively depict cross-sectional views of tube 10 and elongate member 12 taken along lines 2—2 and 3—3 of FIG. 1. Elongate member 12 is an elastomeric material that can be solid (as shown) or hollow. For purpose of illustration, tube 10 has an inner surface that is circular in shape and elongate member 12 has an outer surface that is circular in shape. However, this need not be the case. In general, as will become apparent from the following description, it is only preferred for the cross-sectional profile of the inside surface of tube 10 and the cross-sectional profile of the outside surface of elongate member 12 to be similarly shaped.

By way of illustrative example, the present invention will be described in detail below for the construction of a fiber optic hydrophone array in which tube 10 represents a fiber optic hydrophone and elongate member 12 represents the central support member for the array. For such a construction, it is desired to have a very close fit between the outer cross-sectional profile of elongate member 12 and the inner cross-sectional profile of tube 10 in order to minimize the possibility of forming air pockets or voids between these two elements. Accordingly, the diameter $D_{10}$ of tube 10 is generally no larger than the diameter $D_{12}$ of elongate member 12. While such dimensional constraints cause the hinderance or even prevention of sliding tube 10 over and along elongate member 12, it is this tight tolerance that is desirable in fiber optic hydrophone arrays.

To facilitate the initial placement of tube 10 on elongate member 12, a free end 13 of elongate member 12 can be tapered as shown to a diameter that is less than diameter $D_{10}$. For reasons that will be described further below, the length $L_{13}$ of the taper is generally longer than the length $L_{10}$ of tube 10.

The construction method of the present invention as it relates to a fiber optic hydrophone array will now be described with the aid of FIGS. 4–9 which depict a construction sequence for a fiber optic hydrophone array having two fiber optic hydrophones. However, it is to be understood that the construction method can be replicated for any number of such hydrophones.

Figure 4:
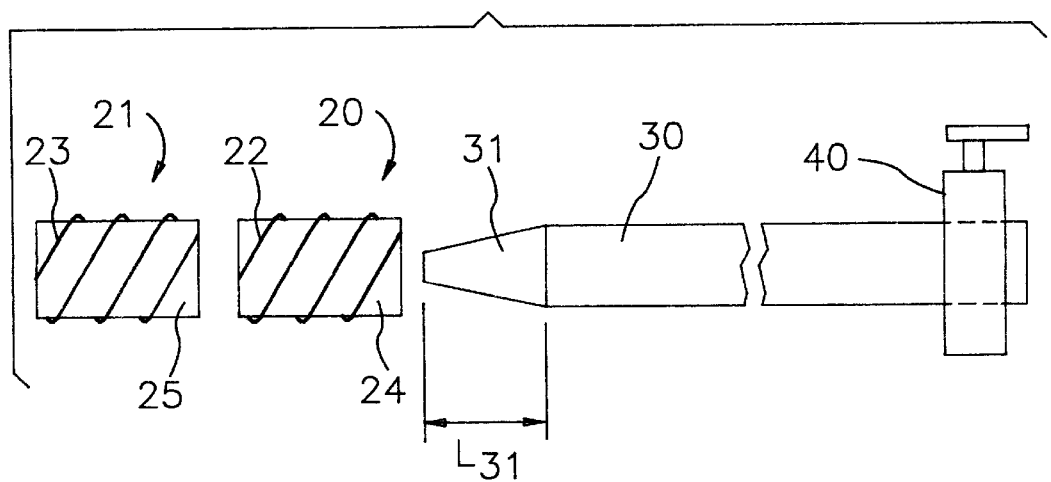

In FIG. 4, fiber optic hydrophones 20 and 21 are shown prior to being positioned and secured on central support member 30. Hydrophones 20 and 21 are formed with optical fibers 22 and 23, respectively, wrapped around rigid, hollow mandrels 24 and 25, respectively. Such fiber optic hydrophones are well known in the art and will therefore not be described further herein. As described above, the inside profiles of mandrels 24 and 25 are similarly shaped relative to the outside profile of central support member 30. The size, i.e., diameter, of each mandrel 24 and 25 is equal to or slightly less than the size, i.e., diameter, of support member 30.

For construction of a fiber optic hydrophone array, support member 30 is made from an elastomeric material such as buna/N rubber or silicone. Free end 31 of support member 30 is tapered so that its outside dimensions facilitate the initial placement of each hydrophone thereon. A clamp 40 is attached to support member 30 a distance away from free end 31. Initial placement of clamp 40 should be in the proximity of where the first hydrophone, e.g., hydrophone 20, is to be positioned and secured on support member 30.

In FIG. 5, the construction process begins as hydrophone 20 is slid over the tapered portion of free end 31. The length of taper $L_{31}$ is typically longer than hydrophone 20 so that a portion free end 31 can be grabbed by clamp 42. Clamp 40 is fixed relative to clamp 42. A pulling force is then applied to clamp 42 in the direction of arrow 44 such that tension is experienced longitudinally by support member 30. Such tension causes support member 30 to stretch owing to its elastomeric properties thereby reducing the cross section of support member 30 between clamps 40 and 42. The reduced cross section of support member 30 between clamps 40 and 42 facilitates the sliding of hydrophone 20 along support member 30.

Placement of clamp 40 is in the proximity of where hydrophone 20 is to be positioned in order to permit localized control in the reduction of the cross section of support member 30. In the case where the distance between free end 31 and clamp 40 is substantial, a localized pulling force, represented by arrow 46 in FIG. 6, can be applied to support member 30 to cause a localized reduction in cross section near clamp 40. While support member 30 is reduced in cross section, a layer 50 of adhesive (e.g., epoxy or any other suitable adhesive) is applied to support member 30 at the desired point of placement of hydrophone 20.

Figure 9:
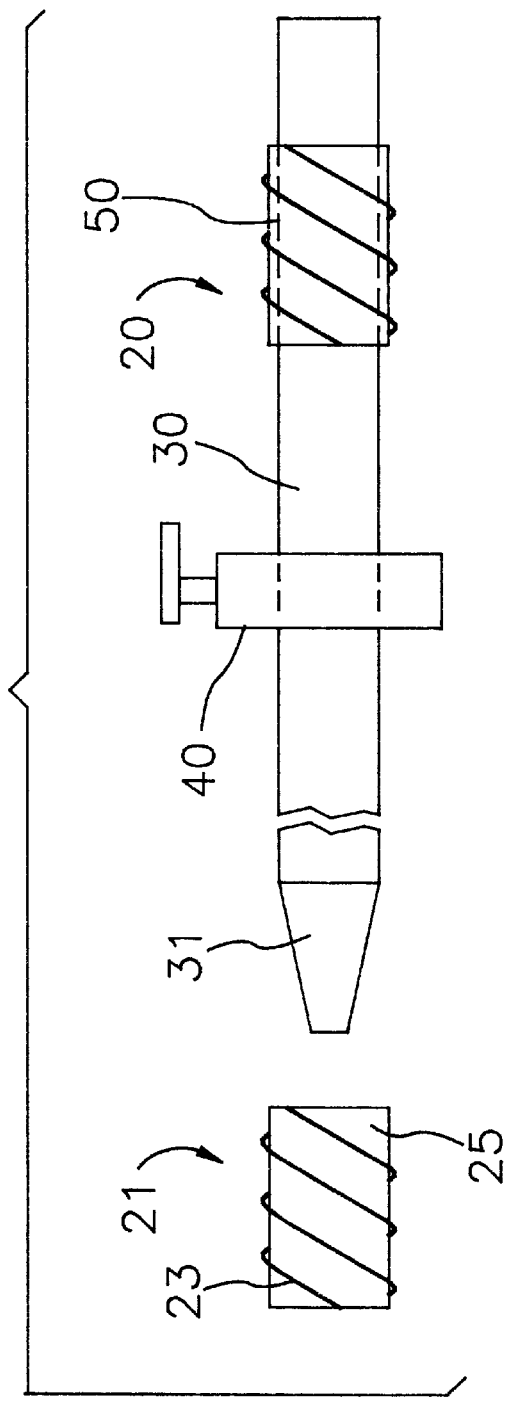
FIG. 9 is a side view of the support member with the clamp indexed to the next construction position for placing and securing the next successive hydrophone in accordance with the present invention.

In FIG. 7, hydrophone 20 is shown being slid along support member 30 over adhesive 50 while localized pulling force 46 is still being applied. Then, as shown in FIG. 8, localized pulling force 46 and pulling force 44 are slowly removed so that the longitudinal tension in support member 30 is relaxed. This allows support member 30 to expand radially outward thereby causing excessive amounts of adhesive 50 and any trapped air to be squeezed from between hollow mandrel 24 and support member 30. As a result, a uniform and void-free layer of adhesive 50 couples hydrophone 20 to support member 30. The above process is repeated by indexing the position of clamp 40 to the proximity of the next desired hydrophone position that is next closest to free end 31 as shown in FIG. 9.

The advantages of the present invention are numerous. A fiber optic hydrophone array can be constructed such that a void-free layer of adhesive bonds each hydrophone to a support member. The construction process is simple and flexible with respect to adjusting the spacing of the hydrophones during the construction process. The process could be implemented manually or could be automated for long-length hydrophone arrays.

Figure 10:
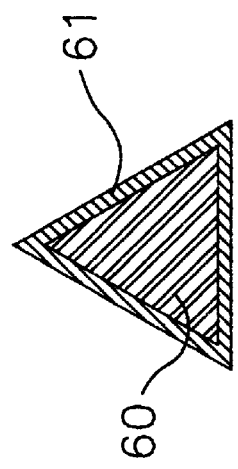
FIG. 10 is a cross-sectional view of a triangularly shaped tube and support member.

The process can be implemented for any correspondingly shaped tube and support member as long as the outside profile of the support member nests within the inside profile of the tube. For example, as shown in FIG. 10, support member 60 could be triangular with its apices nesting within the apices of tube 61 that is also triangularly shaped. Obviously the above would be true for other profiles such as squares, pentagons, hexagons, etc.

The process could be further extended to work with tubes having inside diameters or dimensions that are less than the support member to which they are to be secured. In this way, the support member would have a larger diameter on either side of each such tube. Thus, the tube's position would be secure even if the adhesive broke down over time.

Accordingly, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fiber optic hydrophone array comprising:

a plurality of fiber optic hydrophones, each of said plurality of fiber optic hydrophones having a rigid hollow mandrel wrapped with at least one optical fiber;

an elongate elastomeric member supporting and positioning said plurality of fiber optic hydrophones in a spaced apart fashion, said elongate elastomeric member having a cross section that hinders each said hollow mandrel from sliding thereover; and an evenly distributed, void-free layer of adhesive between each of said plurality of fiber optic hydrophones and said elongate elastomeric member.

2. A fiber optic hydrophone array as in claim 1 wherein said elongate elastomeric member is selected from the group consisting of buna/N rubber and silicone.

3. A fiber optic hydrophone array as in claim 1 wherein said cross section of said elongate elastomeric member and an inside cross-sectional profile of each said hollow mandrel are similarly shaped.

4. A fiber optic hydrophone array as in claim 3 wherein said elongate elastomeric member nests within said inside cross-sectional profile of each said hollow mandrel.

5. A fiber optic hydrophone array as in claim 1 wherein said cross section of said elongate elastomeric member is circular.

6. A fiber optic hydrophone array as in claim 5 wherein an inside cross-sectional profile of each said hollow mandrel defines a circle.

7. A fiber optic hydrophone array as in claim 6 wherein the diameter of said circle of each said hollow mandrel is no larger than the diameter of said elongate elastomeric member between each of said plurality of fiber optic hydrophones.

* * * * *